(No Model.)

D. BEST.
STEERING WHEEL CARRIAGE.

No. 421,884. Patented Feb. 18, 1890.

Witnesses,

Inventor,
Daniel Best.
By Dewey & Co.
Attys

UNITED STATES PATENT OFFICE.

DANIEL BEST, OF SAN LEANDRO, CALIFORNIA.

STEERING-WHEEL CARRIAGE.

SPECIFICATION forming part of Letters Patent No. 421,884, dated February 18, 1890.

Application filed November 15, 1889. Serial No. 330,457. (No model.)

*To all whom it may concern:*

Be it known that I, DANIEL BEST, a citizen of the United States, residing at San Leandro, Alameda county, State of California, have invented an Improvement in Steering-Wheel Carriages; and I hereby declare the following to be a full, clear, and exact description of the same.

My invention relates to the class of steering apparatus specially applicable for road-locomotives, traction-engines, and similar heavy vehicles.

My invention consists in the novel construction and arrangement of the steering-wheel carriage hereinafter fully described, and specifically pointed out in the claims.

The object of my invention is to provide a simple and effective steering-wheel carriage, which can be operated easily and with the least amount of friction, at the same time being steady in its action and durable.

Figure 1:
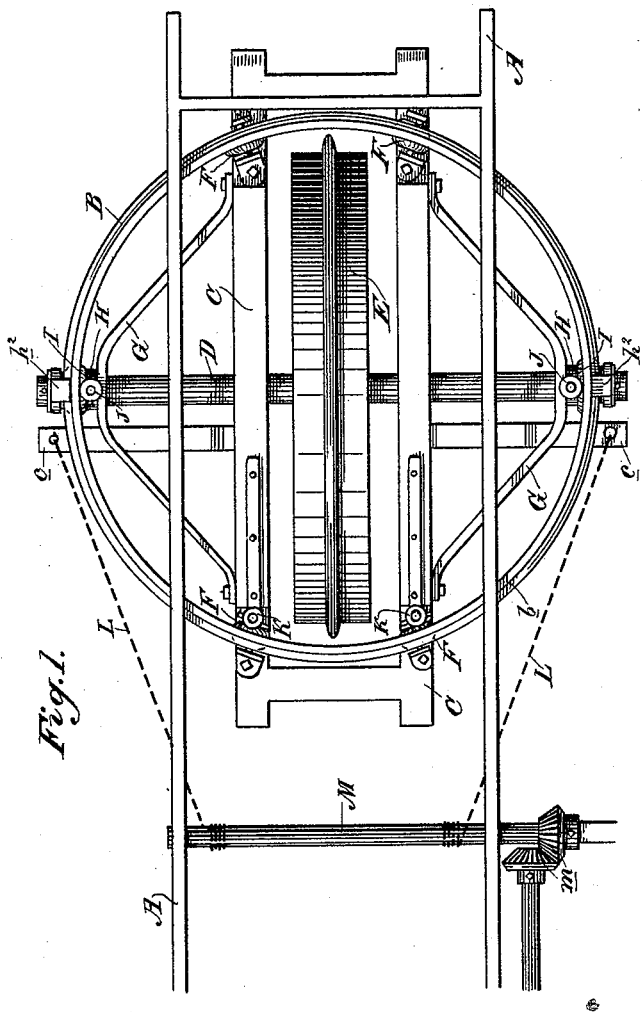
Figure 2:
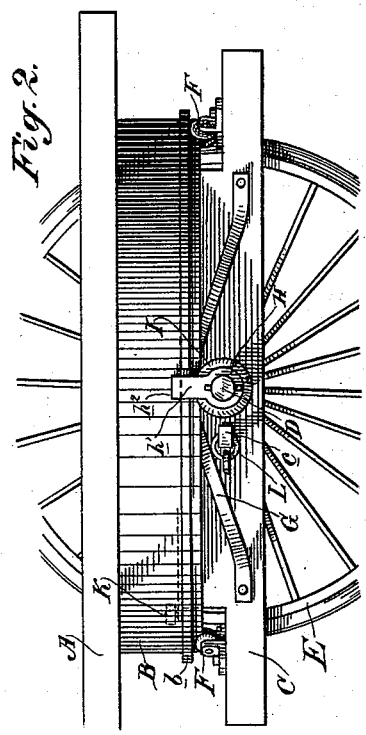
Figure 3:
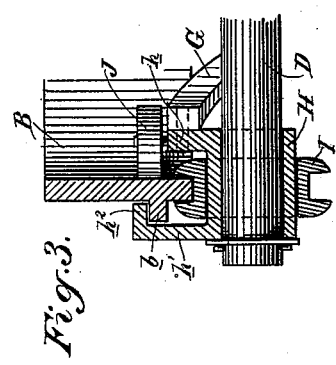

Referring to the accompanying drawings for a more complete explanation of my invention, Figure 1 is a plan view of my steering-wheel carriage. Fig. 2 is a side elevation. Fig. 3 is a detail of the bearing at the axle end.

A is a portion of the main frame of the vehicle. To the under side of this is firmly bolted or otherwise secured the circular guide-track B.

C is a swinging frame, which carries the boxes in which the axle D is journaled, said axle carrying at its center the steering-wheel E, which lies and plays between the sides of the swinging frame C. This frame C bears up under the circular track B through the intervention of anti-friction rollers F, which are mounted upon the side bars of the frame C, near each end thereof, and have grooved faces in which the bottom of the circular track B rests. These form the forward and back guides for the swinging frame.

For the sides I have the following construction: Bolted to the side bars of the frame C are the outwardly-extending curved braces G, to the outer centers of which are bolted the inner flanges $h$ of the sleeves H, which are mounted freely upon the ends of the axle. Upon these sleeves are mounted the anti-friction guide and steadying rollers I, which have grooved faces fitting the under side of the circular track B. The sleeves H have also an outer flange $h'$, with an inturned upper end $h^2$, which bears over a flange $b$ on the outer surface of the circular track B, and serves to further steady and hold the parts together. Mounted upon the top of the inner flanges $h$ of the sleeves are the side steadying-rollers J, which bear against the inner surface of the circular track B.

Mounted upon the rear ends of the side bars of the frame C are the relief-rollers K, which bear against the inner surface of the circular track B. From this construction it will be seen that the frame C, with its axle D and steering-wheel E, has a swinging motion through a circle or portion thereof, being guided in this motion, first, by means of the main carrying-rollers F and steadied laterally by the rollers I at each end of the axle, and further steadied by the inner bearing-rollers J and the flange top $h^2$, so that the movement of these parts is a perfectly true one, not subject to variation or deflection of any kind, and having a minimum of friction. The sleeves on the outer ends of the axle do not interfere with the proper rotation of said axle, but at the same time furnish suitable bearings for the rollers I and J and for the flange top $h^3$, holding the parts well together. The relief-rollers K are to ease up any sudden jar which the steering-wheel may receive by reason of encountering an obstruction, and they do this by coming in a kind of rolling contact with the circular track B.

The swinging movement of the axle may be accomplished in any suitable manner, and I have here shown for this purpose the outwardly-extending arms $c$ of the swinging frame C, to which are attached the chains L, the rear ends of which wind up on and unwind from a cross-shaft M, operated by suitable beveled gears $m$.

Having thus described my invention, what I claim as new, and desire to secure by Letters Patent, is—

1. In a steering-wheel carriage, the combination of the fixed circular track, the swinging frame under it, the axle carried by the frame, the steering-wheel on the axle, the independent sleeves H on the axle ends, and the anti-friction rollers I, mounted on the sleeves and bearing under the fixed circular track, substantially as herein described.

2. In a steering-wheel carriage, the combination of the fixed circular track, the swinging frame, the axle carried by the frame, the steering-wheel on the axle, the anti-friction rollers F on each end of the swinging frame bearing under the circular track, the sleeves H on each end of the axle, and the anti-friction rollers I, mounted on the sleeves and bearing under the circular track, substantially as herein described.

3. In a steering-wheel carriage, the combination of the fixed circular track, the underlying swinging frame, the axle carried thereby, the steering-wheel on the axle, the outwardly-projecting braces G from each side of the swinging frame, the independent sleeves H, secured to the outer end of the braces and mounted upon the ends of the axle, and the anti-friction rollers I, carried by said sleeves and bearing under the circular track, substantially as herein described.

4. In a steering-wheel carriage, the combination of the fixed circular track, the underlying swinging axle, the independent sleeves mounted on the axle ends and having vertical inner flanges $h$, the horizontal rollers J on the top of said flanges, bearing against the inner surface of the fixed track, and the anti-friction rollers I, mounted on the sleeves and bearing under the fixed track, substantially as herein described.

5. In a steering-wheel carriage, the combination of the fixed circular track having the outer flange $b$, the swinging axle under said track, the independent sleeves mounted on the axle ends, said sleeves having vertical outer flanges with inturned upper ends $h^2$, bearing over the flange of the fixed track, and the anti-friction rollers I on the sleeves, bearing under the fixed track, substantially as herein described.

6. In a steering-wheel carriage, the combination of the fixed circular track having the outer flange $b$, the swinging axle, the independent sleeves mounted on the axle ends and having inner and outer vertical flanges, the latter of which has an inturned end bearing over the outer flange of the fixed track, the rollers J on the upper ends of the inner flanges, and the rollers I, mounted on said sleeves and bearing under the fixed track, substantially as herein described.

7. In a steering-wheel carriage, the combination of the fixed circular track B, having an outer flange $b$, the swinging frame C, the axle D, carried by the frame, the wheel E on the axle, the braces G, extending outwardly from the swinging frame, the independent sleeves H, secured to the braces and mounted on the axle ends, said sleeves having the vertical flanges $h$ and $h'$, the latter of which has an inturned end bearing over the flange of the fixed track, the rollers J on the tops of the flanges $h$ and bearing against the inner surface of the fixed track, and the anti-friction rollers I on the sleeves, bearing under the fixed track, substantially as herein described.

8. In a steering-wheel carriage, the combination of the fixed circular track B, the swinging frame C, the axle D, carried by the frame, the steering-wheel on the axle, and the relief-rollers K, mounted on the rear ends of the swinging frame and bearing against the inner surface of the fixed track, substantially as herein described.

9. A steering-wheel carriage comprising the following parts, in combination, to wit: the fixed circular track B, having an outer flange $b$, the swinging frame C, the axle D, mounted in the frame, the steering-wheel on the axle, the outwardly-extending braces G, carried by the swinging frame, the anti-friction rollers F on the ends of the swinging frame and bearing under the fixed track, the independent sleeves H, secured to the braces G and mounted on the axle ends, the holding-flange $h^2$ of said sleeves, bearing over the track-flange, and inner bearing-rollers J of said sleeves, acting against the inner surface of the track, and the anti-friction rollers I, mounted on the sleeves and bearing under the fixed track, all arranged and adapted to operate substantially as herein described.

In witness whereof I have hereunto set my hand.

DANIEL BEST.

Witnesses:
S. H. NOURSE,
H. C. LEE.